United States Patent [19]

Sakashita et al.

[11] Patent Number: 5,413,413
[45] Date of Patent: May 9, 1995

[54] BEARING DEVICE

[75] Inventors: Hiroshi Sakashita; Yukio Kotagiri, both of Nagano, Japan

[73] Assignee: Kabushiki Kaisha Sankyo Seiki Seisakusho, Nagano, Japan

[21] Appl. No.: 131,956

[22] Filed: Oct. 8, 1993

[30] Foreign Application Priority Data

Oct. 9, 1992 [JP] Japan .............................. 4-076520 U
Jun. 10, 1993 [JP] Japan .............................. 5-036314 U

[51] Int. Cl.⁶ ........................ F16C 21/00; F16C 19/10
[52] U.S. Cl. ................................. 384/126; 384/606; 384/615
[58] Field of Search ............... 384/126, 127, 128, 590, 384/606–618, 619–623, 902

[56] References Cited

U.S. PATENT DOCUMENTS

| | | | |
|---|---|---|---|
| 309,532 | 12/1884 | Ely | 384/128 |
| 323,761 | 8/1885 | White | 384/618 |
| 655,711 | 8/1900 | Hoffmann | 384/612 |
| 908,872 | 1/1909 | Leopold | 384/609 |
| 1,215,314 | 2/1917 | Siegfried | 384/606 |
| 4,466,751 | 8/1984 | Higuchi | 384/126 |
| 5,252,871 | 10/1993 | Inoue | 310/90 |

FOREIGN PATENT DOCUMENTS

| | | | |
|---|---|---|---|
| 743916 | 4/1933 | France | 384/590 |
| 2264912 | 5/1975 | Germany | 384/126 |
| 148846 | 6/1988 | Japan | 310/90 |
| 280645 | 11/1990 | Japan | 310/90 |
| 1210678 | 10/1970 | United Kingdom . | |
| 1340607 | 12/1973 | United Kingdom . | |

*Primary Examiner*—Thomas R. Hannon
*Attorney, Agent, or Firm*—Sughrue, Mion, Zinn, Macpeak & Seas

[57] ABSTRACT

A bearing device includes a rotating shaft; a first bearing including a bearing ring rotating with the rotating shaft and a plurality of rolling bodies which are contacted by the bearing ring; and second bearing in which the rotating shaft is rotatably mounted, the second bearing having a flange member which is brought into contact with the plurality of rolling bodies, is integrally formed in the second bearing and is disposed on the opposite side of the rolling bodies, in an axial direction of the rotating shaft through the bearing ring.

8 Claims, 4 Drawing Sheets

BEARING DEVICE

BACKGROUND OF THE INVENTION

1. Field of the Invention

This invention relates to bearing devices used in various kinds of motors.

2. Related Art

Spindle motors having the kind of structure shown in FIG. 14 are widely known and are used for example for floppy disk drive (FDD) motors. In FIG. 14, reference numeral 21 denotes a spindle which is the rotating shaft of the motor, and this spindle 21 is rotatably mounted in a bearing device 30. A hub plate 22 and a rotor yoke 23 are fixed to the spindle and rotate as one with the spindle 21, and a disk-shaped drive magnet 25 is fitted to the rotor yoke 23. The bearing device 30 is mounted on a stator base 27, and a coil 29 is fitted to the portion of the stator base 27 that faces the drive magnet 25.

FDD motors are increasingly required to be thin, and in this respect facing surface constructions such as that shown in FIG. 14 are good. However, because in facing surface type motors the thrust load is greater than the radial load, compared to facing edge type, the bearing device 30 consists of two different types of bearing: a ball bearing (roller bearing) 33, which bears the thrust load; and a sintered, oil impregnated bearing 32, which bears the radial load.

Especially in spindle motors used in FDDs, it requires that the hub plate 22 has to be a precision part. If the hub plate 22 is not sufficiently well balanced it will shake, and the clearance between the head and the disk will be varied because the disk loaded onto it will also shake. For this reason, in a spindle motor, the bearing structure is very important.

However, the following problems are associated with conventional bearing devices:

(1) Because the axial dimension of the sintered & oil impregnated bearing 32 is short, high precision cannot be ensured.

(2) Because a ball bearing 33 is used, some lubrication is necessary, and since it is not possible to supply oil to the bearing, wear and hence seizure occur readily, and bearing life is short.

(3) The use of two different types of bearing, i.e. the ball bearing 33 and the sintered & oil impregnated bearing 32, raises the cost of the motor and, because space is required, makes it difficult to reduce the overall diameter of the motor.

SUMMARY OF THE INVENTION

In view of the foregoing problem, an object of the present invention is to provide a bearing device which is of high precision, which has a long life, and which is low in cost.

More specifically, the present invention relates to a bearing device comprising a rotating shaft; a first bearing including a bearing ring rotating with the rotating shaft and a plurality of rolling bodies which are contacted on one side by the bearing ring; and a second bearing in which the rotating shaft is rotatably mounted. The second bearing has a flange member which is brought into contact with the plurality of rolling bodies, the flange member being integrally formed as part of the second bearing and being disposed on the opposite side of the rolling bodies, in an axial direction of the rotating shaft through the bearing ring.

DESCRIPTION OF THE PREFERRED EMBODIMENTS

Preferred embodiments of the present invention will now be described, with reference to the accompanying drawings.

Figure 1:
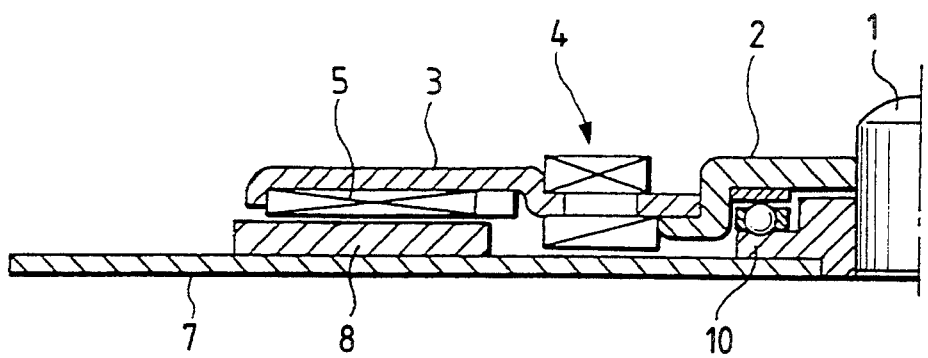
FIG. 1 is a partial-cross-sectional view of first preferred embodiment of the bearing device of the present invention.

FIG. 1 is a partial cross-sectional view of a first preferred embodiment of a bearing device according to the present invention; reference numeral 1 denotes a spindle 1 such as a rotating shaft of the motor, and this spindle 1 is rotatably mounted in a bearing device 10. A hub plate 2 and a rotor yoke 3 are fixed to the spindle 1 so as to make up a rotor assembly 4. Reference numeral 5 denotes a disk-shaped drive magnet mounted on the rotor yoke 3. The rotor assembly 4 and the drive magnet 5 make up the rotor part of the motor.

Figure 2:
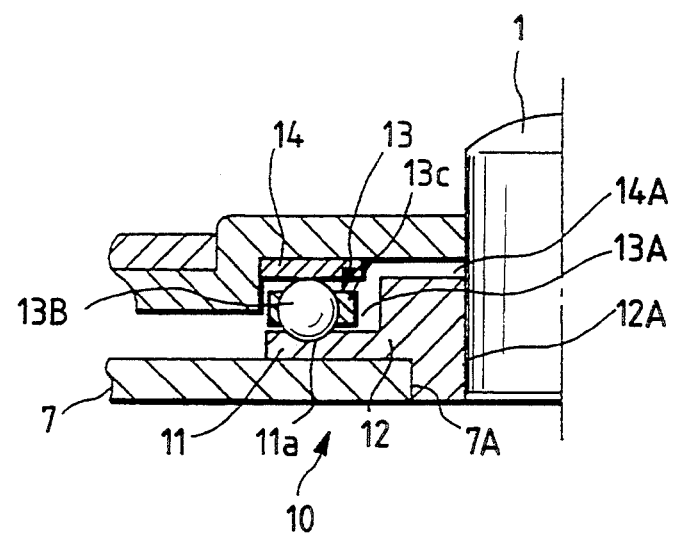
FIG. 2 is an enlarged view of the main parts of the bearing device shown in FIG. 1.

Reference numeral 7 denotes a stator base, and an air-core coil 8 is mounted on the part of this stator base 7 in such a manner that the air-core coil 8 faces the drive magnet 5 in the axial direction. As shown in an enlarged view in FIG. 2, the bearing device 10 consists of a sintered & oil impregnated bearing 12, having a flange portion 11 provided with a groove 11a, fitted into a hole 7A in the stator base 7; a ball bearing 13 having a plurality of rolling bodies 13B which roll in the groove 11a in the flange 11; and a bearing ring 14, disposed above the ball bearing 13, which serves as a ball race. The holes 12A, 13A, and 14A, together with the hole 7A, accommodate the spindle 1. Reference numeral 13C denotes a holder which holds the plurality of rolling bodies 13B.

The stator base 7 and the air-core coil 8 make up the stator part of the motor.

In the bearing device 10, consisting of the sintered & oil impregnated bearing 12 and the ball bearing 13, the flange portion 11 serves as one of the bearing races of the roller bearing and is in direct contact with the rolling bodies. With this construction, the sintered & oil impregnated bearing 12 and the spindle 1 function as radial bearings, and the flange portion 11 effects as a thrust bearing by making contact with the bearing ring 14 via the rolling bodies of the ball bearing 13. The radial bearing portion of the sintered & oil impregnated bearing 12 is made as long as possible, and the hub plate 2 is made as thin as possible. The flange portion 11 is brought into contact with the rolling bodies 13B, and is brought into contact with these rolling bodies 13B through lubricating oil at all times.

Figure 3:
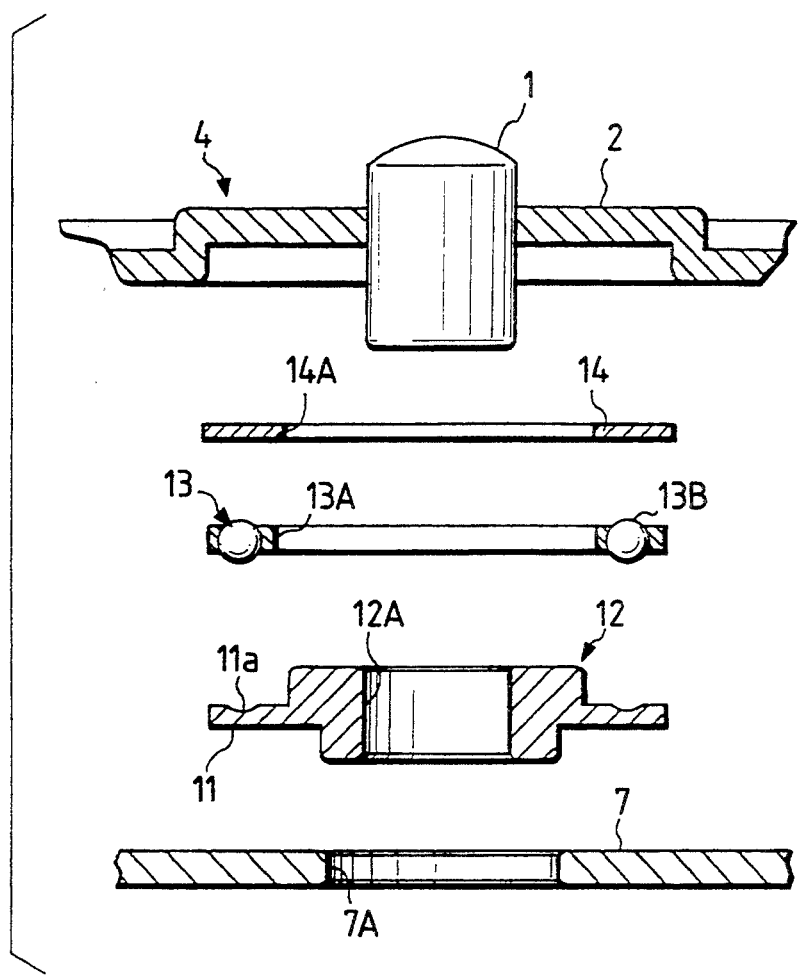
FIG. 3 is an assembly drawing of the bearing device shown in FIG. 1.

FIG. 3 is an exploded assembly view of the bearing device of this first preferred embodiment; the stator base 7, the sintered & oil impregnated bearing 12, the ball bearing 13, the bearing ring 14 and the rotor assembly 4 are stacked in order as shown. First, the sintered & oil impregnated bearing 12 is fitted into the hole 7a in the stator base, and the ball bearing 13 is mounted in such way that the rolling bodies 13B lie in the groove 11a in the flange portion 11 of the sintered & oil impregnated bearing 12. Then, the bearing ring 14 is positioned on top of the ball bearing 13, the spindle 1 of the rotor assembly 4 is inserted through the holes 14A, 13A, 12A, and 7A, and the construction shown in FIG. 1 is obtained.

With the first preferred embodiment, because, in the construction of the sintered & oil impregnated bearing 12 and the ball bearing 13 which make up the bearing device 10, a groove 11a is formed in the upper end surface of the sintered & oil impregnated bearing 12 and the rolling bodies 13B of the ball bearing 13 are disposed in this groove 11a, the following benefits are enjoyed:

(1) Because the axial length of the sintered & oil impregnated bearing is increased, high precision in such factors as perpendicularity and freedom from shaking can be ensured.
(2) Because one of the bearing races of the roller bearing is formed by the sintered & oil impregnated bearing, lubrication is good and friction and wear are reduced, and bearing life is long.
(3) Because both the thrust and the radial loads are born by one type of bearing, cost reductions can be achieved and efficient use of space is made.

Figure 4:
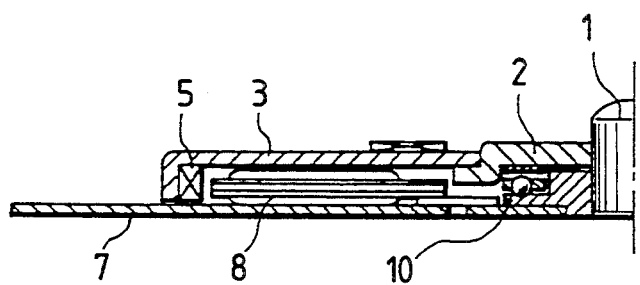
FIG. 4 is a cross-sectional view of second embodiment of the present invention.

FIG. 4. is a sectional view of second embodiment, in which the invention is applied to a FDD motor of a facing edge type. This FDD motor is made up of an axle 1; a rotor part, provided with a drive magnet 5, which rotates as one with the axle 1; and a stator part which has an air-core coil 8 which faces the drive magnet 5 of the rotor part. The air-core coil 8 is wound an appropraite number of times around a stator core having several salient poles.

Figure 5:
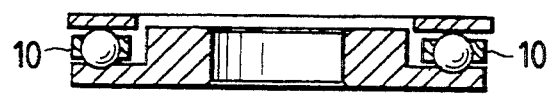
FIGS. 5 and 6 are cross-sectional views of third embodiment of the present invention.
Figure 6:
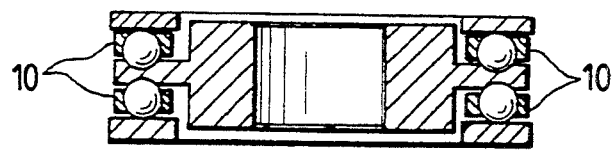

FIGS. 5 and 6 are views of third preferred embodiments in which the bearing device is of a flat seat type to which the concept of the present invention is applied. FIGS. 5 and 6 show to a single-type bearing and a double-type bearing, respectively.

Figure 7:
FIGS. 7 and 8 are cross-sectional views of fourth embodiment of the present invention.
Figure 8:
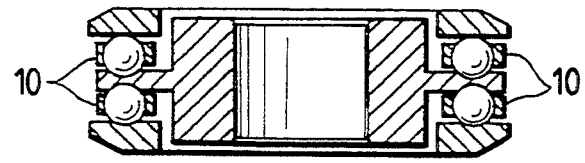

FIGS. 7 and 8 are sectional views of fourth embodiments of the present invention in which the bearing device is of an aligning seat type to which the concept of the present invention is applied. FIGS. 7 and 8 show a single-type bearing and a double-type bearing, respectively.

Figure 9:
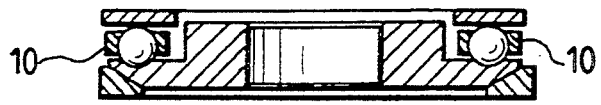
FIGS. 9 and 10 are cross-sectional views of fifth preferred embodiment of the invention.
Figure 10:
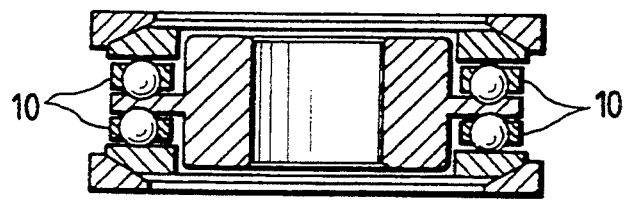

FIGS. 9 and 10 are sectional views of fifth preferred embodiments of the present invention in which the bearing device, having an aligning seat washer, to which the concept of the present invention is applied. FIGS. 9 and 10 show a single-type bearing and a double-type bearing, respectively.

In view of the foregoing, the flange portion 11 of the sintered & oil impregnated bearing 12 are not limited by the groove 11a described in the first Embodiment. For example, in the first preferred Embodiment, a groove 11a is formed in the flat surface of the flange 11 along the path of the rolling bodies 13B, alternatively a projecting portion can be provided on one side or on both sides of the path of the rolling bodies 13B instead of forming the groove 11a.

Figure 11:
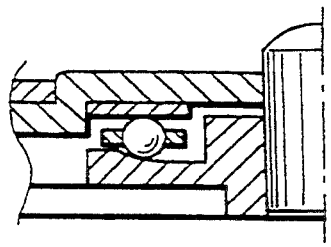
FIGS. 11 to 13 are cross-sectional views of the bearing portion of the present invention.
Figure 13:
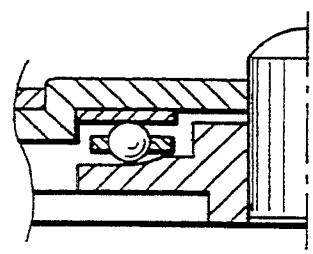
Figure 14:
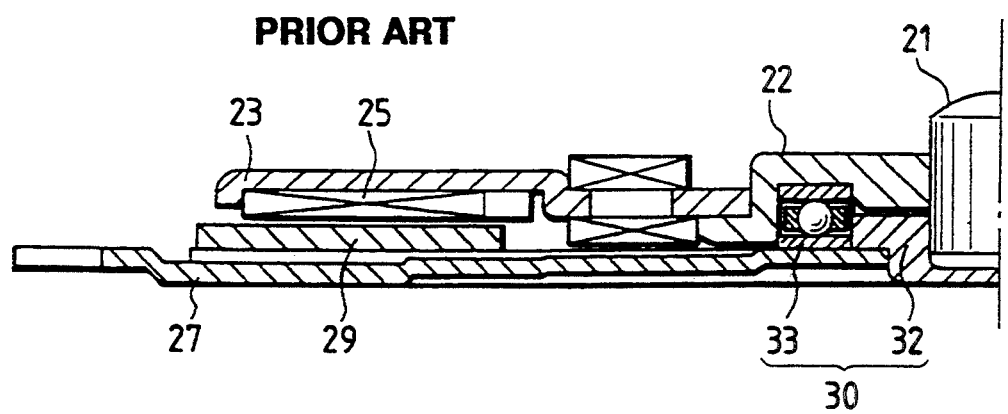
FIG. 14 is a cross sectional view of a conventional bearing device.

FIGS. 11 and 13 are views of embodiments in which a projecting portion (R shaped) is provided on one side of the path of the rolling bodies 13B.

Figure 12:
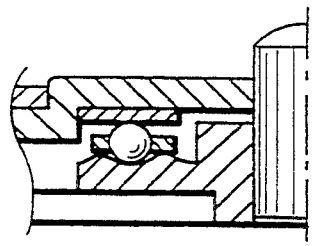

FIG. 12 is a view of an embodiment in which a projecting portion is provided on both sides of the path of the rolling bodies 13B.

All these preferred embodiments described above are enjoyed to similar benefits to those of the first embodiment.

Of course, this invention is not limited to the preferred embodiments described above.

As described above, with this invention, because a groove is formed in the upper surface of the sintered & oil impregnated bearing and the rolling bodies of the ball bearing are positioned in this groove, a bearing device having high precision, long life, and low cost can be made.

What is claimed is:

1. A bearing device comprising:
   a rotating shaft;
   a first bearing including a bearing ring rotating with the rotating shaft and a plurality of rolling bodies which are contacted on one side by the bearing ring; and
   a second bearing comprising a sintered and oil impregnated bearing in which the rotating shaft is rotatably mounted, the second bearing having a flange member which is brought into contact with the plurality of rolling bodies, is integrally formed as part of the second bearing and is disposed on the opposite side of the rolling bodies, in an axial direction of the rotating shaft through the bearing ring.

2. A bearing device as claimed in claim 1, wherein a concave groove is defined in the flange member and the rolling bodies are positioned in the concave groove.

3. A bearing device as claimed in claim 1, wherein a projecting portion is defined in the flange member and the rolling bodies are positioned and brought into contact with the projecting portion.

4. A bearing device as claimed in claim 1, wherein the rolling bodies comprise balls, and wherein the bearing ring, the balls and the flange member form a ball bearing.

5. A bearing device according to claim 4, wherein the ball bearing is of flat seat type.

6. A bearing device according to claim 4 wherein the ball bearing is of aligning seat type.

7. A bearing device according to claim 4, wherein the ball bearing has an aligning seat washer.

8. A bearing device as claimed in claim 1 further comprising:
   a rotor member rotating with the motor rotating shaft and the rotor member being provided with a drive magnet; and
   a stator member provided with a coil which faces the drive magnet of the rotor member in the axial direction of the rotating shaft.

* * * * *